United States Patent
Krishnan et al.

(10) Patent No.: US 9,042,931 B2
(45) Date of Patent: May 26, 2015

(54) DISTRIBUTED POWER LEVEL SELECTION METHOD AND SYSTEM FOR CELLULAR WIRELESS NETWORKS UNDER JOINT CONSTRAINTS

(75) Inventors: Komandur R. Krishnan, Bridgewater, NJ (US); Hanan Luss, Monroe, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 795 days.

(21) Appl. No.: 13/227,713

(22) Filed: Sep. 8, 2011

(65) Prior Publication Data

US 2012/0238278 A1    Sep. 20, 2012

Related U.S. Application Data

(60) Provisional application No. 61/380,730, filed on Sep. 8, 2010.

(51) Int. Cl.

| | |
|---|---|
| *H04B 7/00* | (2006.01) |
| *H04W 52/12* | (2009.01) |
| *H04W 52/14* | (2009.01) |
| *H04W 52/24* | (2009.01) |
| *H04W 52/36* | (2009.01) |
| *H04W 24/02* | (2009.01) |
| *H04W 84/04* | (2009.01) |

(52) U.S. Cl.
CPC .............. *H04W 52/12* (2013.01); *H04W 24/02* (2013.01); *H04W 52/143* (2013.01); *H04W 52/244* (2013.01); *H04W 52/367* (2013.01); *H04W 84/045* (2013.01)

(58) Field of Classification Search
USPC ..................... 455/522, 67.13, 63.1
See application file for complete search history.

(56) References Cited

U.S. PATENT DOCUMENTS

| | | | |
|---|---|---|---|
| 2004/0127224 A1 | 7/2004 | Furukawa et al. | |
| 2009/0042596 A1* | 2/2009 | Yavuz et al. | 455/522 |

(Continued)

FOREIGN PATENT DOCUMENTS

| | | |
|---|---|---|
| JP | A 2001-036455 | 2/2011 |
| WO | WO 2006/130091 A1 | 12/2006 |

(Continued)

OTHER PUBLICATIONS

International Application No. PCT/US2011/050782—PCT International Report dated Dec. 18, 2011.

(Continued)

*Primary Examiner* — Daniel Lai

(57) ABSTRACT

A distributed method and system are presented for determining the largest Signal-to-Interference-and-Noise Ratio (SINR) that can be achieved by a plurality of small wireless cells, such as femtocells or picocells, while satisfying a specified SINR value for multiple large cells, referred to as macrocells. The method also determines the minimum power levels at each of the femtocells that achieve the maximum SINR for the femtocells. The distributed synchronous algorithm executes all intensive computations independently, locally at each of the femtocells. The computations are synchronized in time and executed simultaneously at all cells where after each of the iterations information of interim power selections at the multiple cells is exchanged among the femtocells. Eventually, the computations converge to the maximum SINR value and the corresponding minimum-power solution.

6 Claims, 3 Drawing Sheets

(56) References Cited

U.S. PATENT DOCUMENTS

| | | |
|---|---|---|
| 2009/0197603 A1 | 8/2009 | Ji et al. |
| 2010/0035628 A1* | 2/2010 | Chen et al. ............... 455/452.2 |
| 2010/0035647 A1* | 2/2010 | Gholmieh et al. ............ 455/522 |
| 2010/0124930 A1 | 5/2010 | Andrews et al. |
| 2010/0220682 A1 | 9/2010 | Tao et al. |
| 2011/0195740 A1* | 8/2011 | Kou et al. .................... 455/522 |

FOREIGN PATENT DOCUMENTS

| | | |
|---|---|---|
| WO | WO 2010/129933 A1 | 11/2010 |
| WO | WO 2011/082414 A1 | 7/2011 |

OTHER PUBLICATIONS

Yates, R. D., "A Framework for Uplink Power Control in Cellular Radio Systems," IEEE Journal on Selected Areas in Communications, vol. 13 No. 7, pp. 1341-1347, Sep. 1995.

Thanabalasingham, T. et al., "Joint Allocation of Subcarriers and Transmit Powers in a Multiuser OFDM Cellular Network," IEEE ICC 2006 Proceedings, pp. 269-274.

Hanly, S.V., "An Algorithm for Combined Cell-Site Selection and Power Control to Maximize Cellular Spread Spectrum Capacity," IEEE Journal on Selected Areas in Communications, vol. 13 No. 7, pp. 1332-1340, Sep. 1995.

Chandrasekhar, V. et al., "Femtocell Networks: A Survey," IEEE Communications Magazine, pp. 59-67, Sep. 2008.

Altman, E.et al. "S-Modular Games and Power Control in Wireless Networks", IEEE Transactions on Automatic Control, vol. 48, No. 5, pp. 839-842, May 2003.

Claussen, H.et al., "An Overview of the Femtocell Concept," Bell Labs Technical Journal 13(1), pp. 221-245, 2008.

* cited by examiner

DISTRIBUTED POWER LEVEL SELECTION METHOD AND SYSTEM FOR CELLULAR WIRELESS NETWORKS UNDER JOINT CONSTRAINTS

CROSS-REFERENCE TO RELATED APPLICATIONS

This application claims the benefit of U.S. Provisional Application No. 61/380,730, filed on Sep. 8, 2010, which is incorporated by reference herein in its entirety.

FIELD OF THE INVENTION

The present invention relates to the selection of power levels in cellular wireless networks. Specifically, the invention relates to the selection of power levels in multiple small wireless cells while considering the existence of larger wireless cells. More specifically, the invention relates to the selection of power levels in multiple femtocells or picocells that serve a small area such as an individual houses or larger apartment complexes within a larger area served by macrocells.

BACKGROUND OF THE INVENTION

Current cellular wireless networks provide service using large base-stations, referred to as macrocells, that transmit and receive communications channels over relatively large areas. Although the wireless technology is improving at a rapid pace, service providers are exploring the value of introducing a large number of small cellular wireless cells within individual houses, shopping centers and other complexes in order to free capacity for the macrocells and providing better service quality within the small cells. This invention presents a distributed power level selection method in an area that includes many small wireless cells (e.g., femtocells that cover individual houses or even apartments, or picocells that cover larger complexes like shopping centers). The power level selection method must also consider the existence of larger wireless cells (e.g., macrocells) that serve the entire area not covered by the small cells.

The emergence of small cells like femtocells or picocells creates new opportunities and challenges to the cellular carriers. Since these small cells would use the cellular licensed spectrum, they may interfere with the use of macrocells which are the infrastructure used by cellular carriers. Thus, the power levels selected for the femtocells must be coordinated to prevent unacceptable interferences among themselves and for the macrocells. Although the method is generic for small wireless cells introduced within an area served by large wireless cells we use below the terminology of femtocells and macrocells. V. Chandrasekhar, J. G. Andrews, and A. Gatherer, "Femtocell Networks: A Survey", *IEEE Communications Magazine*, 46, 59-67, September 2008 and H. Claussen, L. T. W Ho, and L. G. Samuel, "An Overview of the Femtocell Concept", *Bell Labs Technical Journal*, 13, No. 1, 221-246, 2008 present overview papers on femtocell networks integrated within an area served by macrocells.

Consider an area with multiple femtocells and macrocells, where the power level of the macrocells is fixed (hereinafter, small cells are referred to as femtocells and large cells as macrocells). The goal is to determine the power level for each of the femtocells so that the following constraints are satisfied:

(i) Each of the femtocells can provide adequate Signal-to-Interference and Noise-Ratio (SINR) throughout the area covered by the femtocell; and
(ii) The macrocells can provide adequate SINK throughout the area served by macrocells.

It is assumed that a cell-dependent set of critical locations is given as input for each of the femtocells and for each of the macrocells. The critical locations are expected to be those where the SINR is expected to be the worst in the covered area. A viable power level selection method should consider appropriateness of the SINRs at the critical locations associated with each of the femtocells and with each of the macrocells.

Multiple papers have been published on determination of minimum-power solutions. In the context of the present invention, these papers select the minimum power level for each of the femtocells so that their SINR is at least as large as a specified parameter. Although these papers focus on different applications, the issues and the underlying mathematical problems are similar. A sample of these references includes S. V. Hanly, "An Algorithm for Combined Cell-Site Selection and Power Control to Maximize Cellular Spread Spectrum Capacity", *IEEE Journal on Selected Areas in Communications*, 13, 1332-1340, 1995, R. D. Yates, "A Framework for Uplink Power Control in Cellular Radio Systems", *IEEE Journal on Selected Areas in Communications*, 13, 1341-1347, 1995, and E. Altman and Z., Altman, "S-Modular Games and Power Control in Wireless Networks", *IEEE Transactions on Automatic Control*, 48, 839-842, 2003. These references present distributed algorithms that find the minimal powers where all the computations are done locally. These references focus on a single layer of cells, like the femtocells, and do not consider constraints imposed by existing, larger cells such as macrocells.

T. Thanabalasingham, S. V. Hanley, L. L. H. Andrew, and J. Papandriopoulos, "Joint Allocation of Subcarriers and Transmit Powers in a Multiuser OFDM Cellular Network", IEEE ICC Proceedings, 269-274, 2006 and K. J. Kerpez, T. Lan, K. Sinkar, and L. Kant, "System and Method for Resource Allocation of a LTE Network Integrated with Femtocells", U.S. Patent Publication No. 2011-0183678, extend the previous work and present algorithms for power allocation in an environment with two types of cells where power levels for both types are decision variables. The fainter reference finds the minimum-power solution, while the latter maximizes data rates while imposing constraints on the selected power levels. Although these references address an important issue of managing two types of cells (lige femtocells and macrocells), an unresolved issue is then to bound the area where power levels are changed for both femtocells and macrocells without affecting other macrocells that are not included in the area. It seems more appropriate to keep the power levels of the macrocells fixed at specific values while determining power levels for femtocells in a bounded area.

The present invention provides a distributed algorithm that determines the maximum SINR that can be satisfied by all the femtocells while also satisfying a specified SINR parameter for the macrocells. The power levels selected for the femtocells are the minimum-power solutions for the maximum SINR that can be satisfied by all the femtocells. The power levels of the macrocells is specified as input and cannot be changed. This algorithm executes all intensive computations independently, locally at each of the femtocells. The timing of the distributed computations is synchronized. The computations are executed simultaneously at all cells where after each of the iterations information of interim power levels selections at the multiple cells is exchanged among the femtocells.

Eventually, the distributed computations converge to the maximum SINR value and the corresponding minimum-power solution.

SUMMARY OF THE INVENTION

The emergence of new architectures of cellular wireless networks, comprising numerous small cells, referred to as femtocells and picocells, integrated within a network of existing large cells, referred to as macrocells, creates new opportunities and challenges. The femtocells and picocells will be used in individual houses and larger complexes like shopping malls, thus freeing up scarce bandwidth capacity for the network of macrocells. However, new challenges arise since these small cells would use the cellular licensed spectrum. Hence, they may interfere among themselves and with the use of macrocells which are the infrastructure used by the cellular carriers.

Consider an area with multiple femtocells and macrocells, where the power level of the macrocells is fixed. The goal is to determine the power level for each of the femtocells so that the following constraints are satisfied:

(i) Each of the femtocells can provide adequate Signal-to-Interference and Noise-Ratio (SINR) throughout the area covered by the femtocell; and (ii) The macrocells can provide adequate SINR throughout the area served by the macrocells.

The present invention provides a new distributed algorithm that determines the maximum SINR that can be satisfied by all the femtocells while also satisfying a specified SINR parameter for the macrocells. The power levels selected for the femtocells are the minimum-power levels possible to achieve the maximum SINR for the femtocells. The power levels of the macrocells is specified as input and cannot be changed. This new algorithm extends previous algorithms that find minimum-power solutions while satisfying specified femtocell SINR parameters (or some similar variation), but they do not attempt to maximize the SINR that can be achieved by the femtocells.

This novel distributed algorithm executes all intensive computations independently, locally at each of the femtocells. The computations are synchronized in time and executed simultaneously at all cells where after each of the iterations information of interim power level selections at the multiple femtocells is exchanged among the femtocells. Eventually, the computations converge to the maximum SINR value and the corresponding minimum-power solution.

The present invention will be more clearly understood when the following description is read in conjunction with the accompanying drawings.

DETAILED DESCRIPTION

Figure 1:
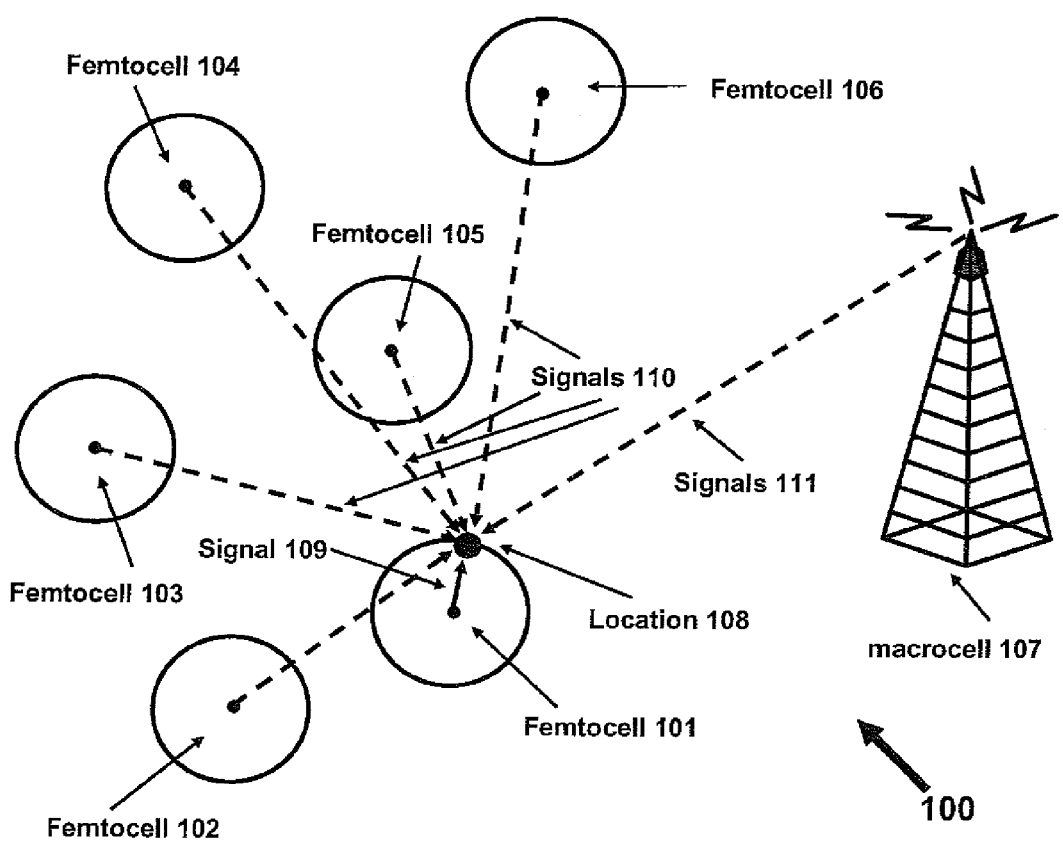
FIG. 1 is a schematic representation of an area served by six femtocells and one macrocell and a single critical location for femtocell 101.

Referring now to the figures and to FIG. 1 in particular, there is shown an example 100 of an area served by six femtocells 101-106 where each of these femtocells serves a small area represented by a circle surrounding the respective femtocell. A femtocell could be, for example, an individual house or a larger complex in which case the cell is often referred to as a picocell. In general, these cells are simply small cells that provide wireless services to small, bounded areas. The entire area is served by a macrocell 107. Today's technology uses only macrocells in cellular wireless networks. In the future, these services may be supplied by a mix of large cells (e.g., macrocells) and numerous small cells (e.g., femtocells and picocells).

FIG. 1 shows a critical location 108 associated with femtocell 101. It is assumed that a cell-dependent set of critical locations is given as input for each of the femtocells. The critical locations are expected to be those where the SINR is expected to be the worst in the area served by the femtocell. FIG. 1 also shows the signal received at the critical location 108 from femtocell 101 and the interfering signals from the other femtocells 102-106 and the macrocell 107. It is reasonable to assume that the critical locations for a femtocell are on the boundary of the cell, as shown by location 108 which is on the boundary of femtocell 101.

Figure 2:
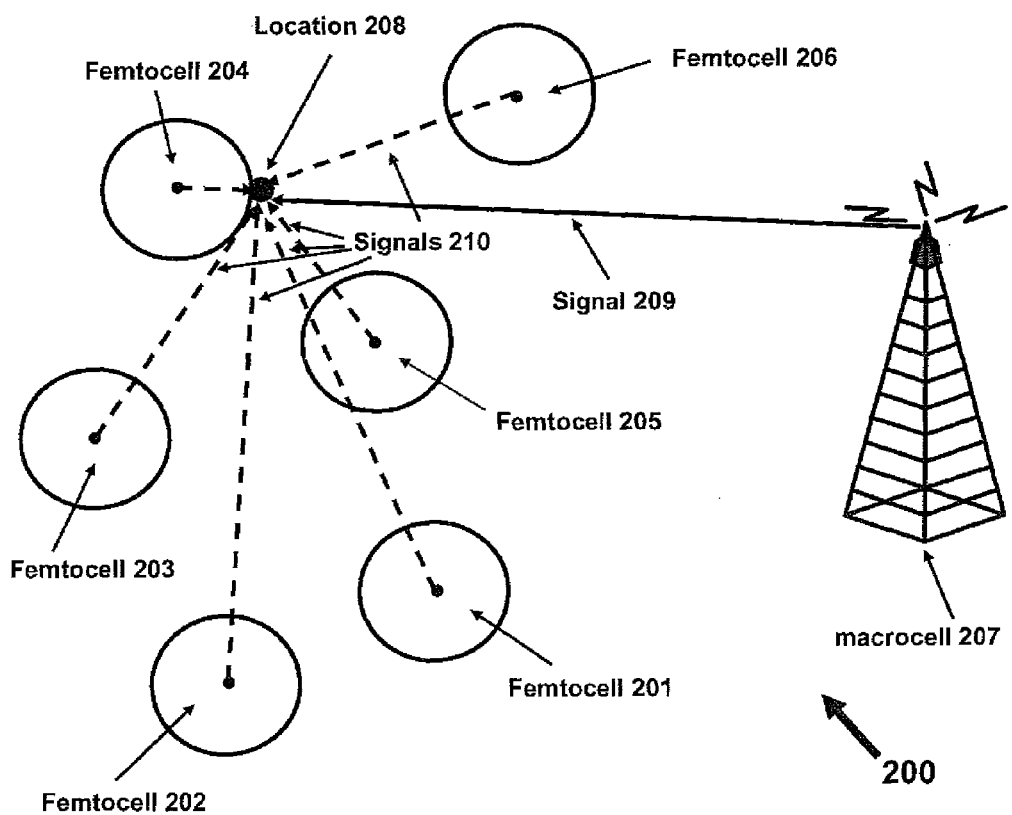
FIG. 2 is a schematic representation of an area served by six femtocells and one macrocell and a single critical location for the macrocell.

Referring now to FIG. 2, there is shown an example 200 of the same area as in FIG. 1 served by six femtocells 201-206 and macrocell 207. FIG. 2 shows a critical location 208 associated with the macrocell 207. Again, it is reasonable to assume that the critical locations for the macrocell are on the boundary of the femtocells, as shown by location 208 which is on the boundary of femtocell 204. In any case, the input to the method in the present invention includes specified sets of critical locations without any specific assumptions. FIG. 2 also shows the signal received at the critical location 208 from the macrocell 207 and the interfering signals from femtocells 201-206. For each critical location of the macrocell, a specified microcell SINR must be satisfied. Note that if the area is served by more than one macrocell, it can readily be determine which macrocell serves each of the critical points (i.e., the microcell providing the strongest signal). Hence, for simplification of the presentation the description is limited to a single macrocell without any loss of generality.

The following notation is used:

$j, k$=Indices for femtocells where J is the set of all femtocells considered.

m=Index for macrocell.

s=Index for selected critical locations. Let $S_j$ be the set of selected critical locations for femtocell j, and let Q be the set of selected critical locations for the macrocell.

$g_j(s)$=Signal loss factor from the center of femtocell j to location s.

$g_m(s)$=Signal loss factor from the macrocell to location s.

$P_m$=Transmit power level (also referred to as signal strength) of the macrocell (input)

$P_j$=Transmit power level (also referred to as signal strength) of femtocell j. $P_j$, j∈J, are the decision variables. P={$P_j$, j∈J} denotes the vector of the $P_j$'s.

N=The noise level (independent of location).

$T_m$=Minimum SINR required for the macrocell connections.

$T_f$=Minimum SINR required for the femtocell connections (independent of j).

Using different noise levels at each of the locations, rather than the same noise level, is straightforward.

Any femtocell power assignment scheme must satisfy the following constraints:

$$\frac{P_j g_j(s)}{\sum_{k \in J \setminus j} P_k g_k(s) + P_m g_m(s) + N} \geq T_f; \quad (1)$$

$s \in S_j$ for all $j \in J$.

$$\frac{P_m g_m(s)}{\sum_{k \in J} P_k g_k(s) + N} \geq T_m; \quad (2)$$

$s \in Q$ $P_j \geq 0$ for all $j \in J$. $\quad (3)$

Constraints (1) ensure that the SINR's of the femtocells meet the required threshold at the selected critical locations. Constraints (2) ensure that the SINR's of the macrocells meet the required threshold at the selected critical locations. Note that if multiple macrocells serve the area, then constraints (1) would include an interference term (which is simply a constant) for each of these macrocells. Constraints (2) would have a single constraint for each critical location $s \in Q$ associated with the macrocell that provides the strongest signal at that location.

Suppose $P^1$ satisfies constraints (1)-(3) and $P^1 \leq P$ for any vector $P$ that also satisfies constraints (1)-(3). Then, $P^1$ is referred to as the minimum-power solution.

The Minimum-Power Model (MINP Model) is formulated by rearranging constraints (1)-(3) as follows:

The MINP Model

Find the minimum-power solution $P = \{P_j, j \in J\}$ $\quad (4.1)$ such that $$P_j \geq \sum_{k \in J \setminus j} \frac{T_f g_k(s)}{g_j(s)} P_k + \frac{T_f (P_m g_m(s) + N)}{g_j(s)}; \quad (4.2)$$

$s \in S_j$ for all $j \in J$;

$$\sum_{k \in J} g_k(s) P_k \leq \frac{g_m(s) P_m}{T_m} - N; \quad (4.3)$$

$s \in Q$ $P_j \geq 0$; for all $j \in J$. $\quad (4.4)$

Constraints (4.2) are the same as constraints (1) and guarantee appropriate SINRs for the femtocells at the critical locations in the sets $S_j$. Note that $g_j(s)>0$ for $s \in S_j$ in order to be able to serve location $s$. Constraints (4.2) have the special structure that any $P_j$ is bounded below by a linear combination of all other femtocell powers (with nonnegative coefficients) plus a constant. Hence, if $P_j^{(0)} \geq 0$ for all $j \in J$ satisfy constraints (4.2), then, $\gamma P_j^{(0)} \geq 0$ for all $j \in J$ also satisfy constraints (4.2) for any $\gamma \geq 1$. Constraints (4.3) are the same as constraints (2). Each of these constraints states that a linear combination (with nonnegative coefficients) of the femtocell powers cannot exceed a specified parameter.

Suppose that the MINP Model has a feasible solution $P^{(feas)}$ where for some $j_1$ all constraints (4.2) $s \in S_{j_1}$ are satisfied as strict inequalities. We can then decrease $P_{j_1}$ so that at least one of these constraints is satisfied as equality while all others are still satisfied as inequalities. The decrease in one variable at a time can be repeated. Since $P^{(feas)}$ is feasible ($P_j^{(feas)} \geq 0$ for all $j \in J$) and $[T_f(P_m g_m(s)+N)]/g_j(s) \geq 0$ for all $s \in S_j$ and $j \in J$, this variable decrease scheme maintains $P \geq 0$ at all iterations and converges to a feasible solution where for each $j \in J$, there is at least one constraint (4.2) satisfied as equality. The solution at that point satisfies all constraints (4.2)-(4.4) and is a minimum-power solution. Furthermore, the solution to constraints (4.2) that are satisfied as equalities is a minimum-power solution. Under conditions discussed later, this solution is unique.

Since the minimum-power solution is unique, it also minimizes $\Sigma_{j \in J} P_j$. Hence, the MINP Model (with an objective min $\Sigma_{j \in J} P_j$) is a linear programming optimization problem that can be solved using commercially available software. However, note that the linear programming method can only be used as a centralized method where the computations are done at a central location for all femtocells.

The references cited above present variations of algorithms for distributed power level selection, where each of the femtocells executes all required computations locally, using locally available interference measurements. In other words, each femtocell executes its power level computations independently from all other cells until the power levels computed at the various cells converge to the minimum-power solution. Note that these algorithms solve the MINP Model without consideration of constraints (4.3). However, these algorithms can readily be modified to consider the latter constraints. A version of such an algorithm will be described later.

The present invention presents a novel minimum-power algorithm where the threshold $T_f$ in constraints (4.2) is treated as a decision variable that should be maximized. The resulting problem is now a nonlinear programming optimization problem since constraints (4.2) are nonlinear. The objective is to determine the maximum feasible threshold $T_f$ and the corresponding minimum-power solution while satisfying all constraints (4.2)-(4.4).

Formulation of the new model solved by the present invention, and referred to as the Maximum-Threshold Model (MAXT Model), is as follows:

The MAXT Model

Find the maximum $\tau_f$ and the corresponding minimum-power solution $P = \{P_j, j \in J\}$ $\quad (5.1)$ such that $$P_j \geq \sum_{k \in J \setminus j} \frac{\tau_f g_k(s)}{g_j(s)} P_k + \frac{\tau_f (P_m g_m(s) + N)}{g_j(s)}; \quad (5.2)$$

$s \in S_j$ for all $j \in J$;

$$\sum_{k \in J} g_k(s) P_k \leq \frac{g_m(s) P_m}{T_m} - N; \quad (5.3)$$

$s \in Q$ $P_j \geq 0$; $\quad (5.4)$ for all $j \in J$ $\tau_f \geq T_f$. $\quad (5.5)$ Referring now to FIG. 3, there is shown a flow chart 300 of a distributed algorithm, referred to as the DSMAXT Algorithm, that solves the MAXT Model in a distributed way, meaning that the intensive computations are done at each of the femtocells locally, independently from all other femtocells. The computations are done repeatedly, synchronized across all femtocells. After each of the iterations, each femtocell shares the interim power level it computed for its cell with all other femtocells. The process of repeated computations converges to the optimal solution of the MAXT Model, providing the maximum feasible SINR threshold for the femtocells and the corresponding minimum-power solution.

To simplify the presentation, it is assumed for the time being that each of the sets $S_j$ consists of a single location; hence the index s can be dropped since the location is then identified by the index j. Constraints (4.2) and (5.2) can then be written as $$P_j \geq \sum_{k \in J \setminus j} \frac{T_f g_{jk}}{g_{jj}} P_k + \frac{T_f(g_{jm} P_m + N)}{g_{jj}}; \quad (6)$$

for all $j \in J$ where $g_{jk}$ is the signal loss factor from cell k to the critical location of cell j and $g_{jm}$ is the signal loss factor from the macrocell to the critical location of cell j. Note that an index j replaces dependency on $s \in S_j$.

Figure 3:
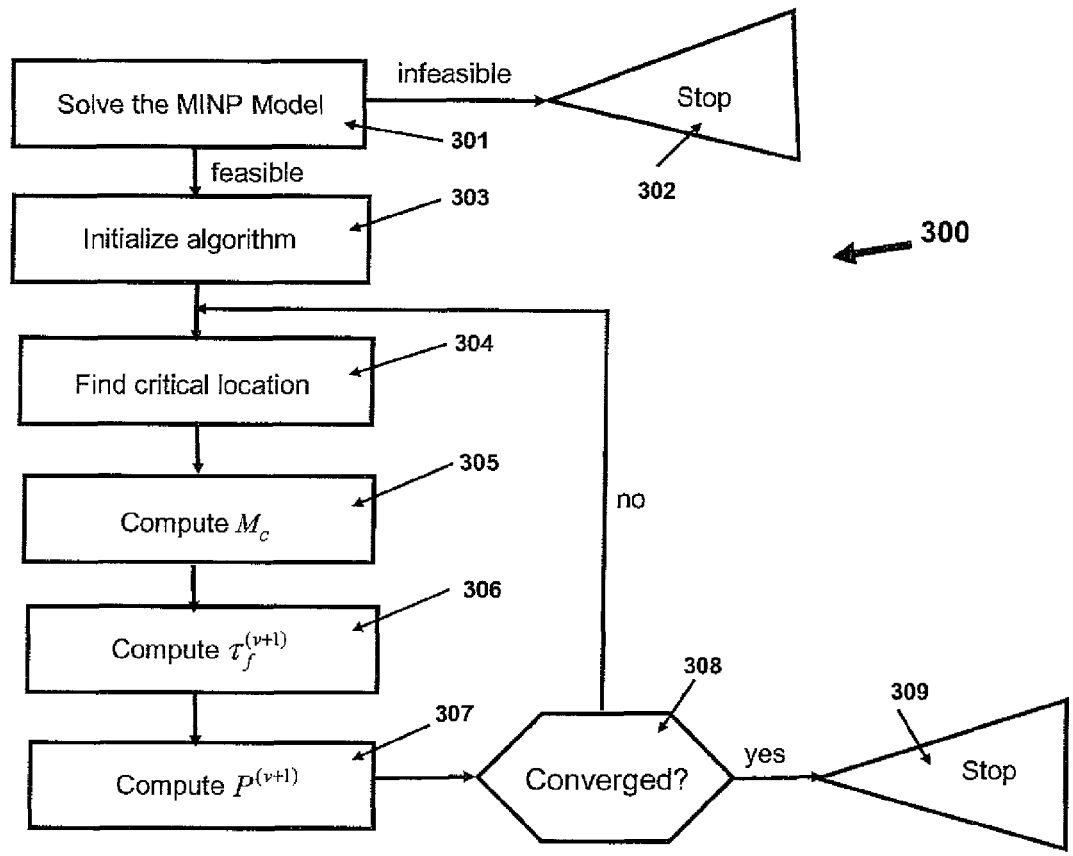
FIG. 3 is a flow chart of a distributed algorithm that computes the largest feasible SINR for the femtocells and the corresponding minimum-power solution, while satisfying a specified SINR parameter for the macrocells.

A summary of the algorithm as presented in FIG. 3 is given below.

The DSMAXT Algorithm

Step 301 Solve the MIND Model using the Distributed Synchronous Minimum-Power Algorithm (the DSMINP Algorithm) described below:

a. Initialize $v=0$ and $P^{(0)}=\{P_j^{(0)}, j \in J\}=0$.

b. Compute $$P_j^{(v+1)} = \sum_{k \in J \setminus j} \frac{T_f g_{jk}}{g_{jj}} P_k^{(v)} + \frac{T_f(g_{jm} P_m + N)}{g_{jj}}; \quad (7)$$

for all $j \in J$ c. Check Constraints (4.3). If one or more of these constraints are violated, go to Step 302.

d. If $|(P_j^{(v+1)}-P_j^{(v)})/P_j^{(v)}| \leq \epsilon$ for all $j \in J$ for an arbitrarily small $\epsilon > 0$, the minimum-power solution for the MINP Model, referred to as $P^0 = \{P_j^0, j \in J\}$, is obtained; proceed to step 303. Otherwise, return to step b above with $v \leftarrow v+1$ Step 302. Stop; the MAXT Model has no feasible solution.

Step 303. Start with $P^{(0)} = P^0$, $\tau^{(0)} = T_f$ and $v=0$.

Step 304. Find critical location $c \in Q$ that has the smallest macrocell SINR ratio for $P^{(v)}$ (this SINR is the left-hand-side of (2) with $P_k = P_k^{(v)}$ for all $k \in J$).

Step 305. Compute $$M_c \equiv \frac{P_m}{T_m} - \frac{N}{g_{cm}}. \quad (8)$$

Step 306. Compute $$\Delta^{(v+1)} = \frac{M_c}{z^T F P^{(v)} + z^T u} - \tau_f^{(v)} \quad (9.1)$$

where $u=[u_1, \ldots, u_{|J|}]^T$ with $$u_j = \frac{(g_{jm} P_m + N)}{g_{jj}},$$

$z=[z_1, \ldots, z_{|J|}]^T$ with $$z_j = \frac{g_{cj}}{g_{cm}}$$

and the matrix $F=(f_{jk})$ with $$f_{jk} = \frac{g_{jk}}{g_{jj}},$$

$j, k \in J$, $j \neq k$ and $f_{jj}=0$, $j \in J$.

Set $$\tau_f^{(v+1)} = \min[\tau_f^{(v)} + \Delta^{(v+1)}, TMAX], \quad (9.2)$$

where TMAX is the largest possible value of $\tau_f$ (to be derived later) for which convergence is assured.

Step 307. Compute powers $$P_j^{(v+1)} = \tau_f^{(v+1)} \left( \sum_{k \in J \setminus j} \frac{g_{jk}}{g_{jj}} P_k^{(v)} + \frac{(g_{jm} P_m + N)}{g_{jj}} \right); \quad (10)$$

for all $j \in J$.

Step 308. If $|\tau_f^{(v+1)}-\tau_f^{(v)}|/\tau_f^{(v+1)} \leq \delta$ and $|(P_j^{(v+1)}-P_j^{(v)})/P_j^{(v+1)}| \leq \epsilon$ for all $j \in J$ for arbitrarily small $\delta > 0$ and $\epsilon > 0$, go to step 309. Otherwise, update $v \leftarrow v+1$ and return to Step 304.

Step 309. Stop; the optimal solution is $\tau_f^{opt} = \tau_f^{(v+1)}$ and $P^{opt} = P^{(v+1)}$.

More explanations of the algorithm steps are provided below.

The DSMAXT Algorithm starts at step 301 by solving the MINP Model.

Suppose that the MINP Model has a feasible solution $P^{(feas)}$ where for some $j_1$ all constraints (4.2) $s \in S_{j_1}$ are satisfied as strict inequalities. We can then decrease $P_{j_1}$ so that at least one of these constraints is satisfied as equality while all others are still satisfied as inequalities. The decrease in one variable at a time can be repeated. Since $P^{(feas)}$ is feasible ($P_j^{(feas)} \geq 0$ for all $j \in J$) and $[T_f(P_m f_m(s)+N)]/g_{jj}(s) \geq 0$ for all $j \in J$, this variable decrease scheme maintains $P \geq 0$ at all iterations and converges to a feasible solution where for each $j \in J$, there is at least one constraint (4.2) satisfied as equality. The solution at that point satisfies all constraints (4.2)-(4.4) and is the minimum-power solution. Under conditions discussed later and also shown in Yates (1995), this solution is unique.

Since the minimum-power solution is unique, it also minimizes $\Sigma_{j \in J} P_j$. Hence, minimizing $\Sigma_{j \in J} P_j$ subject to constraints (4.1)-(4.3) is a linear programming optimization problem that can be solved in a central location using commercially available software (e.g., the CPLEX software of ILOG, an IBM Company). It is emphasized that the linear programming method can only be used as a centralized method where the computations are done at a central location rather than distributed computations executed locally at each of the femtocells. The DSMINP Algorithm described in step 301 is a distributed algorithm where the power level computations (7) are executed locally at each of the femtocells. Likewise, the convergence checks are computed locally. The term synchronous refers to simultaneous computations executed at each iteration at each of the femtocells. The DSMINP Algorithm is a minor modification of previously published algorithms, e.g., in Yates (1995) supra, does not constitute the present invention by itself. As discussed in Yates (1995), the DSMINP Algorithm need not be synchronized across all femtocells. Synchronization is, however, required for the DSMAX Algorithm.

Note that $P_j^{(1)} \geq P_j^{(0)}$ for all j∈J. Now, suppose $P_j^{(v)} \geq P_j^{(v-1)}$ for all j∈J. Then, recursion (7) results in $P_j^{(v+1)} \geq P_j^{(v)}$ for all j∈J. Note that computations (7) executed at each of the femtocells require only interference information available through measurements without any information exchanges among the femtocells. Constraints (4.3) do not complicate the problem as they are used only to identify infeasibility. As proven, for example, in Yates (1995), if a feasible solution exists, the DSMINP Algorithm is guaranteed to converge to the unique minimum-power solution.

Necessary and sufficient conditions for the existence of a feasible solution to the MINP MODEL without constraints (4.3) are presented below.

Constraints (6) can be written in matrix notation as P≥AP+b. The matrix $A=(a_{jk})$ is $$a_{jk} = \frac{T_f g_{jk}}{g_{jj}}, \quad j, k \in J, j \neq k$$

$$a_{jj} = 0, \quad j \in J.$$

The vector $b=(b_j)$ is given by $$b_j = \frac{T_f(g_{jm}P_m + \text{noise})}{g_{jj}}, \quad j \in J.$$

Recursive equation (7) results in $P^{(v+1)}=(I+A+A^2+ \ldots A^v)b$. Note that $(I+A)^{-1}=I+A+A^2+ \ldots A^v+(I+A)^{-1}A^{v+1}$ for any v. Hence, a necessary and sufficient condition for the algorithm to converge to a solution (ignoring constraints (4.3)) is that the following matrix series is convergent: $(I+A)^{-1}=I+A+A^2+ \ldots A^v + \ldots$ . This requires that the largest eigenvalue of the matrix A must have a magnitude strictly smaller than 1. An infeasible solution is detected when one of the constraints (4.3) is violated, which may occur because a macrocell constraint is too tight (e.g., because $P_m$ is too small or because $T_m$ is too large). Infeasibility may also occur because the vector $P^{(v)}$ does not converge (note that $P^{(v+1)} \geq P^{(v)}$) even in the absence of constraints (4.3). Matrix A can be rewritten as follows: $A=T_f F$ Let $(\lambda_1, \ldots, \lambda_n)$ be the eigenvalues of F. Then, the eigenvalues of A are given by $\{T_f\lambda_1, \ldots, T_f\lambda_n\}$. Hence, for sufficiently small $T_f$, the DSMINP Algorithm converges to a solution, which however, may or may not be feasible with respect to constraint (4.3). Note that the matrix F is nonnegative and irreducible. Then by the Perron-Frobenius theorem (P. Lancaster, *Theory of Matrices*, Academic Press, New York, 1969, p. 285), there is an eigenvalue of F with the largest magnitude, say $\lambda_1$, which is real and positive. A necessary and sufficient condition for the DSMINP Algorithm to converge is $$T_f\lambda_1 < 1 \quad (11)$$

Moreover, it also follows (Lancaster 1969, exercise 4, p. 287) that $$\min_{j \in J} \sum_{k \in J} f_{jk} \leq \lambda_1 \leq \max_{j \in J} \sum_{k \in J} f_{jk}.$$

Thus, a sufficient condition for $T_f\lambda_1 < 1$ to hold is:

$$T_f < \frac{1}{\max_{j \in J} \sum_{k \in J} \left[\frac{g_{jk}}{g_{jj}}\right]} = \min_{j \in J} \frac{1}{\sum_{k \in J} \left[\frac{g_{jk}}{g_{jj}}\right]}. \quad (12)$$

Of course, even if the sufficient condition is not satisfied, the largest eigenvalue $\lambda_1$ can still be computed (for a small matrix F) using numerical methods to determine convergence.

Note from the discussion above it follows that the minimum-power solution $P^0$ is simply the unique solution to the set of linear equations P=AP+b. When $T_f\lambda_1<1$, a unique solution exists with P≥0. Recursion (7) simply facilitates a distributed algorithm for reaching that solution.

Now, recall that the MINP Model may have multiple critical locations in the set $S_j$ that need to be considered for each femtocell j∈J. Hence, equation (7) in the DSMINP Algorithm is replaced by $$P_j^{(v+1)} = \max_{s \in S_j} \left\{ \sum_{k \in J/j} \frac{T_f g_k(s)}{g_j(s)} P_k^{(v)} + \frac{T_f(g_m(s)P_m + N)}{g_j(s)} \right\}; \quad (13)$$

$$j \in J,$$

and the sufficient condition (12) is replaced by $$T_f < \frac{1}{\max_{s \in S_j, j \in J} \sum_{k \in J} \left[\frac{g_k(s)}{g_j(s)}\right]} = \min_{s \in S_j, j \in J} \frac{1}{\sum_{k \in J} \left[\frac{g_k(s)}{g_j(s)}\right]}. \quad (14)$$

The selected critical locations that should be considered may change from one iteration to the next. Nevertheless, as discussed in Yates (1995) (the case of reception from multiple connections), the convergence proof still holds for this case. Intuitively, once the algorithm has executed a number of iterations, the set of critical locations does not change, so that the proof for the single critical location per femtocell holds.

Consider now the computations of $M_c$ and $\tau_f^{(v+1)}$ in steps 305 and 306. When constraint (5.3) is satisfied as equality at critical location c, then:

$$\sum_{j \in J} \frac{g_{cj}}{g_{cm}} P_j = \frac{P_m}{T_m} - \frac{N}{g_{cm}} \equiv M_c. \quad (15)$$

$M_c$ is used to compute a new value of $\tau_f$. Since $M_c$ must be positive, the macrocell must satisfy.

$$T_m < \frac{g_{cm}P_m}{N} \quad (16)$$

which should be considered in conjunction with the necessary condition $\tau_f\lambda_1<1$.

Let TMAX be the largest value of $\tau_f$ for which the condition $\tau_f\lambda_1<1$ is satisfied. Note that condition (12) with $T_f$ replaced by $\tau_f$ is a sufficient condition for $\tau_f\lambda_1<1$ to hold.

Constraints (6) and (15) can be written as $$P \geq \tau_f(FP+u); \quad (17)$$

$$z^T P = M_c. \quad (18)$$

In preparation for an iterative algorithm, the inequality in (17) is replaced with equality. Then, by substituting (18) into (17), the following equation must be satisfied:

$$M_c = z^T P = \tau_f(z^T F P + z^T u) \quad (19)$$

which yields:

$$\tau_f = \frac{M_c}{z^T F P + z^T u}. \quad (20)$$

Using (20), $\tau_f^{(v+1)}$ is computed in step 306 of the DSMAXT Algorithm.

Suppose that the sequence $\{\tau_f^{(v)}\}$ in (9.2) is monotonically non-decreasing. Then, $\{\tau_f^{opt}, P^{opt}\}$ as computed by the DSMAXT Algorithm is the optimal solution to the MAXT Model. This assertion is shown to hold using the following arguments. Since by assumption the sequence $\{\tau_f^{(v)}\}$ in (9.2) is non-decreasing, the sequence $\{P^{(v)}\}$ is also non-decreasing. (It was shown before that recursion (7) in the DSMINP Algorithm satisfies $P_j^{(v+1)} \geq P_j^{(v)}$ for all $j \in J$. The same arguments hold when the sequence $\{\tau_f^{(v)}\}$ is non-decreasing.) The sequence $\{\tau_f^{(v)}\}$ is bounded from above since $$\tau_f^{(v+1)} \leq \min\left[\frac{M}{z^T u}, TMAX\right]$$

where M is the largest $M_c$. Hence, the sequence $\{\tau_f^{(v)}\}$ converges. Moreover, since $(TMAX)\lambda_1 < 1$, eventually the sequence $\{P^{(v)}\}$ computed by recursion (10) in step 307 converges.

While the above description assures convergence by ensuring that the parameter is monotonically non-decreasing, experience has shown the algorithm converges even when steps are not taken to ensure monotonicity.

Suppose that upon convergence, $\tau_f^{opt} < TMAX$. Then $\tau_f^{opt}$ satisfies equation (20) and $P^{opt}$ satisfies (17) with equalities. Thus, $\{\tau_f^{opt}, P^{opt}\}$ satisfies all the constraints (5.2)-(5.5) of the MAXT Model where at least one of the constraints (5.3) is satisfied as an equality. $P_{opt}$ is the minimum-power solution that satisfies constraints (5.2) (all satisfied as equalities). Hence, $\tau_f^{opt}$ is the largest possible $\tau_f$ value for which all the constraints of the MAXT Model can be satisfied. Now, suppose that upon convergence, $\tau_f^{opt} = TMAX$. Again, all the constraints of the MAXT Model are satisfied, where at least one of the constraints (5.3) is satisfied as an equality. The latter holds since the minimum-power vector P is a continuous, increasing function of $\tau_f$ and these power levels approach infinity when $\tau_f$ approaches its bound. Threshold $\tau_f$ cannot exceed TMAX since the sequence $\{P^{(v)}\}$ will not converge and the MAXT Model will be infeasible. Furthermore, $P^{opt}$ is the minimum-power solution that satisfies constraints (5.2) for $\tau_f^{opt}$. Note that even if the sequence $\{\tau^{(v)}\}$ is not monotonically non-decreasing but the DSMAXT Algorithm converges, then $\{\tau_f^{opt}, P^{opt}\}$ as computed by the DSMAXT Algorithm is the optimal solution to the MAXT Model.

The DSMAXT Algorithm is expected to converge in most instances even if the sequence $\{\tau_f^{(v)}\}$ is not monotonically non-decreasing. Nevertheless, in order to guarantee convergence in all cases, the computation of the sequence $\{\tau_f^{(v)}\}$ can be modified so that this sequence is monotonically non-decreasing. For example, this can be achieved by modifying (9.1) to $$\Delta^{(v+1)} = \max\left[\frac{M_c}{z^T F P^{(v)} + z^T u} - \tau_f^{(v)}, 0\right]. \quad (21)$$

However, this modification may lead, upon convergence, to violation of one or more of constraints (5.3). Various schemes can be implemented to decrease the step sizes in (21). For example, whenever the left term in the max operator in (21) is negative, the algorithm could backtrack to the most recent iteration that yielded $\Delta^{(v+1)} > 0$ and use a smaller step size by modifying (21) to $$\Delta^{(v+1)} = \max\left[\alpha\left(\frac{M_c}{z^T F P^{(v)} + z^T u} - \tau_f^{(v)}\right), 0\right] \quad (22)$$

where $\alpha$ is a parameter, $0 < \alpha < 1$.

An alternative method is to use the DSMINP Algorithm for solving the MIMP Model for different values of $T_f$, where the largest value that provides a feasible solution is the sought after $\{\tau_f^{opt}, P^{opt}\}$ for the MAXT Model. However, this approach would require solving many such problems using, for example, a bisection search on $T_f$ until the optimal value is achieved within a specified accuracy.

Recall that constraints (5.2) may have multiple critical locations at the set $S_j$ that need to be considered for each femtocell $j \in J$. When multiple critical locations are considered per femtocell, recursion (10) in step 307 is revised as follows:

$$P_j^{(v+1)} = \max_{s \in S_j} \left\{ \tau_f^{(v+1)} \sum_{k \in J/j} \frac{g_k(s)}{g_j(s)} P_k^{(v)} + \frac{T_f^{(v+1)}(g_m(s)P_m + N)}{g_j(s)} \right\}, \quad (23)$$

$$j \in J.$$

Note that in steps 305 and 306 $M_c$ and the vector $z = [z_1, \ldots, z_{|J|}]^T$ are computed for the most critical location c from among all locations in Q. Also, each $u_j$ in the vector $u = [u_1, \ldots, u_{|J|}]^T$ and each row j of the matrix F in equation (9.1) are constructed from the most critical location $s \in S_j$. The sufficient condition for the existence of a feasible solution for a fixed $\tau_f$ is given by constraint (14) with $T_f$ replaced by $\tau_f$.

The DSMAXT Algorithm is a distributed synchronous method where each of the femtocells $j \in J$ executes locally and independently power computations. To that end, each of the femtocells has computing capabilities and information exchange capabilities through a local computing system. The computing system may be a computer or any type of known or will be known systems and may typically include a processor, memory device, a storage device, input/output devices, internal buses, and/or a communications interface for communicating with other computers in conjunction with communication hardware and software, etc. A module may be a component of a device, software, program, or system that implements some "functionality", which can be embodied as software, hardware, firmware, electronic circuitry, or etc. The computing systems should be synchronized to facilitate simultaneous power level computations at all the femtocells.

As will be appreciated by one skilled in the art, the present invention may be embodied as a system, method or computer program product. Accordingly, the present invention may take the faint of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular fowls "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions stored in a computer or machine usable or readable storage medium or device, which causes the computer or machine to perform the steps of the method when executed on the computer, processor, and/or machine. A computer readable storage medium or device may include any tangible device that can store a computer code or instruction that can be read and executed by a computer or a machine. Examples of computer readable storage medium or device may include, but are not limited to, hard disk, diskette, memory devices such as random access memory (RAM), read-only memory (ROM), optical storage device, and other recording or storage media.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

While there has been described and illustrated a distributed method for power level selections in a cellular wireless network, such as a network comprising multiple femtocells operating within an area served by at least one macrocell it will be apparent to those skilled in the art that modifications and variations are possible without deviating from the principles and broad teachings of the present invention which shall be limited solely by the scope of the claims appended hereto.

What is claimed is:

1. A distributed synchronous method for determining a maximum feasible Signal-to-Interference-and-Noise Ratio (SINR) achievable by multiple small wireless cells and a corresponding minimum power level for each small wireless cell that achieves the maximum SINR, while maintaining a specified SINR parameter for a large wireless cell in an area affected by the multiple small wireless cells, the method comprising the steps of:

performing at each of the multiple small wireless cells, distributed computations that determine minimum power levels at the small wireless cells for achieving a specified SINR value for the small wireless cells, where if a solution is not found, the method terminates, otherwise the method proceeds;

finding a most critical location of the large wireless cell where the SINR parameter for the large wireless cell is the smallest value of all locations in the large wireless cell;

computing at each of the multiple small wireless cells, a new SINR value for the small wireless cells and the corresponding minimum power levels achievable by the small wireless cells; and checking for convergence to an optimal solution that provides the largest feasible SINR for the small wireless cells, with the corresponding minimum power levels, while maintaining the SINR parameter at the critical location of the large wireless cell;

wherein, if convergence has not occurred, initiating another iteration of computations starting from finding a new most critical location.

2. The method as set forth in claim 1, wherein the small wireless cells are femtocells in individual houses and are picocells in larger complexes, and the large wireless cell is a macrocell.

3. The method as set forth in claim 1, further comprising executing computations at each of the small wireless cells locally and independently from all other small wireless cells, where the computations are synchronized among the small wireless cells at each iteration to be executed substantially simultaneously at all small wireless cells, while power level computations are exchanged among all the small wireless cells after computations have been completed for each iteration.

4. A system for determining a maximum feasible Signal-to-Interference-and-Noise Ratio (SINR) achievable by multiple small wireless cells and a corresponding minimum power level for each small wireless cell that achieves the maximum SINR, while maintaining a specified SINR parameter for a large wireless cell in an area affected by the multiple small wireless cells, the system comprising:

means for performing distributed computations locally at each of the small wireless cells that determine minimum power levels at the small wireless cells for achieving a specified small cells SINR value, wherein if a solution is not found, the computations terminate, otherwise the computations proceed;

means for finding a most critical location of the large wireless cell where the SINR parameter for the large wireless cell is the smallest value of all locations in the large wireless cell; and means for performing distributed computations locally at each of the small wireless cells to compute new SINR values and the corresponding minimum power levels that are achievable by the small wireless cells; and means for checking for convergence to an optimal solution that provides the largest feasible SINR for the small wireless cells, with the corresponding minimum power levels, while maintaining the SINR parameter at the critical location of the large wireless cell;

wherein if convergence has not occurred, the small wireless cells initiate another iteration of distributed computations starting with finding a new most critical location.

5. The system as set forth in claim 4, wherein the small wireless cells are femtocells in individual houses and are picocells in larger complexes, and the large wireless cell is a macrocell.

6. A non-transitory computer-readable device having computer-readable program code for determining a maximum feasible Signal-to-Interference-and-Noise Ratio (SINR) achievable by multiple small wireless cells and a corresponding minimum power level for each small wireless cell that achieves the maximum SINR, while maintaining a specified SINR parameter for a large wireless cell in an area affected by the multiple small wireless cells, wherein when the program code is executed by a processor coupled to the computer-readable device in each small wireless cell, the processor performs the steps of:

performing at each of the multiple small wireless cells, distributed computations that determine minimum power levels at the small wireless cells for achieving a specified SINR value for the small wireless cells, where if a solution is not found, the method terminates, otherwise the method proceeds;

finding a most critical location of the large wireless cell where the SINR parameter for the large wireless cell is the smallest value of all locations in the large wireless cell;

computing at each of the multiple small wireless cells, a new SINR value for the small wireless cells and the corresponding minimum power levels achievable by the small wireless cells; and checking for convergence to an optimal solution that provides the largest feasible SINR for the small wireless cells, with the corresponding minimum power levels, while maintaining the SINR parameter at the critical location of the large wireless cell;

wherein, if convergence has not occurred, initiating another iteration of computations starting from finding a new most critical location.

* * * * *

UNITED STATES PATENT AND TRADEMARK OFFICE
CERTIFICATE OF CORRECTION

PATENT NO. : 9,042,931 B2
APPLICATION NO. : 13/227713
DATED : May 26, 2015
INVENTOR(S) : Krishnan et al.

It is certified that error appears in the above-identified patent and that said Letters Patent is hereby corrected as shown below:

References Cited

On Page 2, item (56), under "OTHER PUBLICATIONS", in Column 1, Line 3, delete "vol. 13 No. 7," and insert -- vol. 13, No. 7, --, therefor.

On Page 2, item (56), under "OTHER PUBLICATIONS", in Column 2, Line 6, delete "vol. 13 No. 7," and insert -- vol. 13, No. 7, --, therefor.

In the specification

In Column 2, Line 4, delete "SINK" and insert -- SINR --, therefor.

In Column 2, Line 44, delete "fainter" and insert -- former --, therefor.

In Column 2, Line 48, delete "(lige" and insert -- (life --, therefor.

In Column 4, Line 56, delete "(input)" and insert -- (input). --, therefor.

In Column 4, Line 59, delete "P={P$_j$, jεJ)" and insert -- P={P$_j$, jεJ} --, therefor.

In Column 5, Line 33, delete "P={P$_j$, jεJ)" and insert -- P={P$_j$, jεJ} --, therefor.

In Column 6, Line 40, delete "P={P$_j$, jεJ)" and insert -- P={P$_j$, jεJ} --, therefor.

In Column 7, Line 24, delete "MIND" and insert -- MINP --, therefor.

In Column 8, Line 43, delete "[T$_f$(P$_m$f$_m$(s)" and insert -- [T$_f$(P$_m$g$_m$(s) --, therefor.

In Column 9, Line 47, delete "A=T$_f$F" and insert -- A=T$_f$F. --, therefor.

Signed and Sealed this
Seventeenth Day of November, 2015

Michelle K. Lee
*Director of the United States Patent and Trademark Office*

CERTIFICATE OF CORRECTION (continued)
U.S. Pat. No. 9,042,931 B2

In the specification

In Column 11, Line 22, delete "$P_j^{(v+1)} \geq P_j^{(v)}$" and insert -- $p_j^{(v+1)} \geq p_j^{(v)}$ --, therefor.

In Column 11, Line 36, delete "parameter" and insert -- parameter $\tau$ --, therefor.

In Column 11, Line 43, delete "$P_{opt}$" and insert -- $P^{opt}$ --, therefor.

In Column 12, Line 34, delete "$T_f^{(v+1)}$" and insert -- $\tau_f^{(v+1)}$ --, therefor.

In Column 12, Line 65, delete "faint" and insert -- form --, therefor.

In Column 13, Line 5, delete "fowls" and insert -- forms --, therefor.